US011115507B2

(12) United States Patent
Bhagwat et al.

(10) Patent No.: US 11,115,507 B2
(45) Date of Patent: *Sep. 7, 2021

(54) SERVICE DISCOVERY

(71) Applicant: CABLE TELEVISION LABORATORIES, INC, Louisville, CO (US)

(72) Inventors: Amol Bhagwat, Louisville, CO (US); Darshak Thakore, Broomfield, CO (US); Clarke Stevens, Littleton, CO (US)

(73) Assignee: Cable Television Laboratories, Inc., Louisville, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/563,276

(22) Filed: Sep. 6, 2019

(65) Prior Publication Data

US 2019/0394312 A1    Dec. 26, 2019

Related U.S. Application Data

(60) Continuation of application No. 15/714,656, filed on Sep. 25, 2017, now Pat. No. 10,447,825, which is a division of application No. 14/547,021, filed on Nov. 18, 2014, now Pat. No. 9,774,709.

(60) Provisional application No. 61/905,336, filed on Nov. 18, 2013.

(51) Int. Cl.
*H04L 29/06* (2006.01)
*H04L 29/08* (2006.01)

(52) U.S. Cl.
CPC .............. *H04L 69/24* (2013.01); *H04L 67/16* (2013.01); *H04L 67/02* (2013.01)

(58) Field of Classification Search
None
See application file for complete search history.

(56) References Cited

U.S. PATENT DOCUMENTS

| 8,201,209 | B2 | 6/2012 | Hayashi | |
|---|---|---|---|---|
| 8,606,938 | B1 | 12/2013 | Chong et al. | |
| 2002/0040397 | A1* | 4/2002 | Choi | H04L 61/15 709/226 |
| 2002/0083143 | A1* | 6/2002 | Cheng | H04L 29/06 709/208 |
| 2004/0071148 | A1* | 4/2004 | Ozaki | H04L 69/169 370/401 |
| 2005/0160172 | A1 | 7/2005 | Eytchison | |
| 2008/0056261 | A1* | 3/2008 | Osborn | H04L 61/6081 370/392 |
| 2009/0025042 | A1* | 1/2009 | Lubbers | H04L 12/18 725/70 |
| 2010/0157897 | A1* | 6/2010 | Yoon | H04W 88/16 370/328 |
| 2011/0153789 | A1* | 6/2011 | Vandwalle | H04W 76/14 709/221 |
| 2012/0092235 | A1 | 4/2012 | Ham et al. | |

(Continued)

*Primary Examiner* — Joshua Joo
(74) *Attorney, Agent, or Firm* — Armstrong Teasdale LLP

(57) ABSTRACT

Service discovery and other operations related to enabling devices to announce, discover or otherwise control their services and/or the services offered or available from other devices is contemplated. The service discovery may facilitate service discovery for services sourced from devices inside and outside of a network and/or from devices having incompatible messaging capabilities.

10 Claims, 3 Drawing Sheets

(56) References Cited

U.S. PATENT DOCUMENTS

| | | | |
|---|---|---|---|
| 2012/0110114 A1* | 5/2012 | Meenan | G06F 9/5055 |
| | | | 709/216 |
| 2013/0205018 A1 | 8/2013 | Rahman et al. | |
| 2013/0304922 A1* | 11/2013 | Jackson | H04L 67/1061 |
| | | | 709/225 |
| 2013/0343225 A1* | 12/2013 | Richards | H04L 12/6418 |
| | | | 370/254 |
| 2014/0012967 A1 | 1/2014 | Agarwal et al. | |
| 2014/0207841 A1 | 7/2014 | Requena et al. | |
| 2015/0207873 A1 | 7/2015 | Mang | |
| 2015/0222732 A1* | 8/2015 | Vivien | H04L 67/16 |
| | | | 709/203 |
| 2016/0028650 A1* | 1/2016 | Agarwal | H04L 67/1014 |
| | | | 709/203 |
| 2016/0277803 A1 | 9/2016 | Sarosi et al. | |
| 2018/0323993 A1* | 11/2018 | Ansari | H04L 49/25 |

* cited by examiner

ID
SERVICE DISCOVERY

CROSS-REFERENCE TO RELATED APPLICATIONS

This application is a continuation of U.S. patent application Ser. No. 15/714,656, filed Sep. 25, 2017. U.S. patent application Ser. No. 15/714,656 is a divisional of U.S. patent application Ser. No. 14/547,021, filed Nov. 18, 2014, now U.S. Pat. No. 9,774,709, issued Sep. 26, 2017. U.S. patent application Ser. No. 14/547,021 claims the benefit of U.S. Provisional Application No. 61/905,336, filed Nov. 18, 2013. The disclosures of all of these applications are incorporated by reference herein in their entireties.

TECHNICAL FIELD

The present invention relates to facilitating network service discovery, such as but not necessarily limited to enabling service discovery for services sourced from devices inside and outside of a network and/or from devices having incompatible messaging capabilities.

BACKGROUND

Service discovery, which may be interchangeably referred to as network service discovery, generally relates to a process of services announcing themselves and/or their capabilities to other devices in communication therewith, e.g., devices connected to a common or related network link may facilitate service discovery in order to advertise their services to others, such as in the manner described in U.S. patent application Ser. No. 14/334,027, entitled Service Discovery Within Multi-Link Networks, the disclosure of which is hereby incorporated by reference in its entirety herein.

The contemplated service discovery generally relates to enabling devices to announce, discover or otherwise control their services and/or the services offered or available from other devices. As a single device may offer multiple services and/or be capable performing multiple service related operations, which may take the form of applications, executables, operating systems or other logically functioning constructs, the use of the term "services" is a broad and generic nomenclature intended to encompass any capability of such logically functioning constructs to facilitate delivering content/data, performing operations or otherwise assisting another device, application or service.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
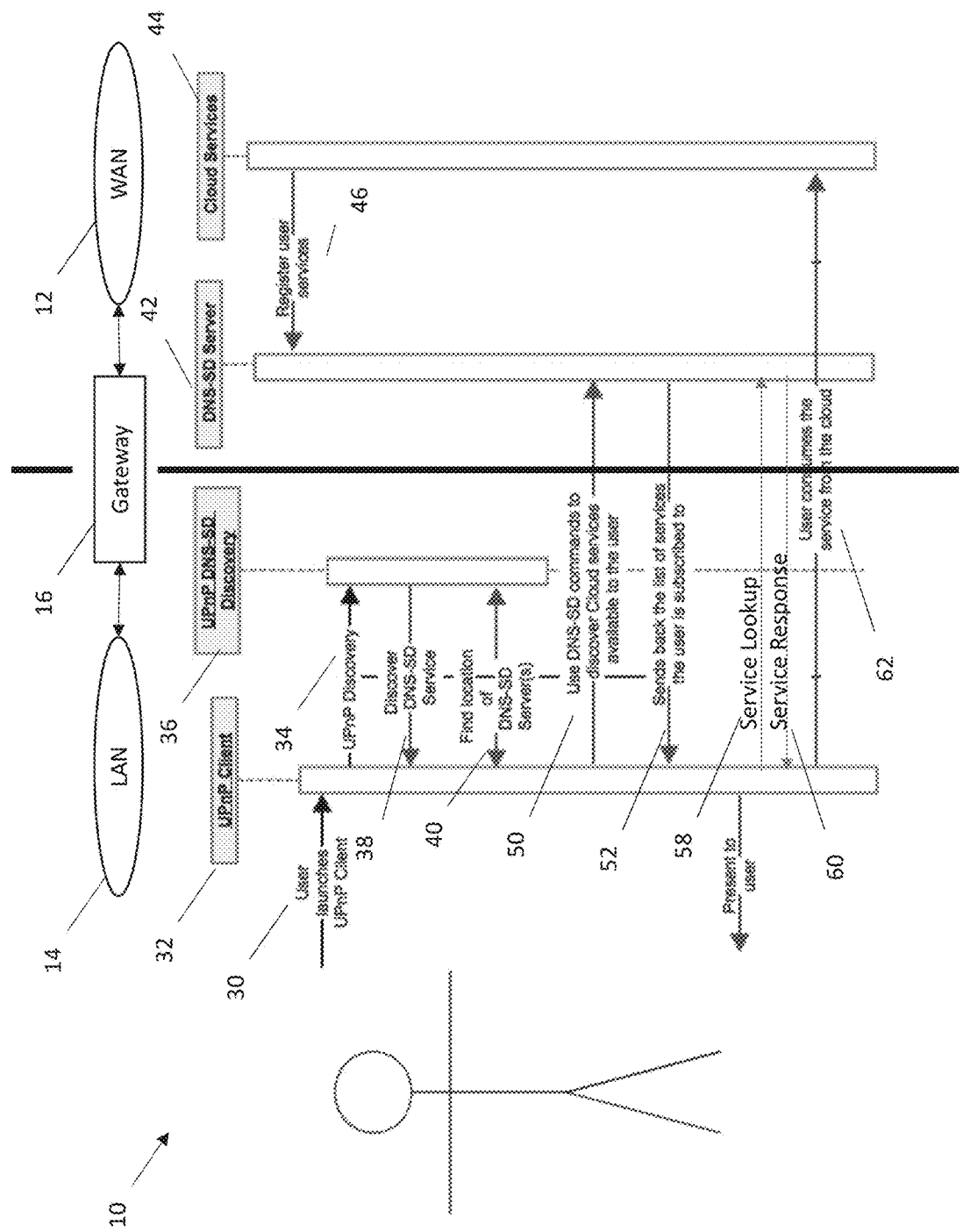
FIG. 1 illustrates a service discovery system in accordance with one non-limiting aspect of the present invention.

FIG. 1 illustrates a service discovery system in accordance with one non-limiting aspect of the present invention. The system describes facilitating service discovery according to Universal Plug and Play (UPnP) and Domain Name System Service Discovery (DNS-SD) for exemplary non-limiting purposes. The UPnP related operations may be based on those described within UPnP Device Architecture 1.0, published October 2008 by the UPnP Forum, the disclosure of which is hereby incorporated by reference in its entirety. The DNS-SD related operations may be based on those described within described in Internet Engineering Task Force (IETF) request for comment (RFC) 6763, entitled DNS-Based Service Discovery, the disclosure of which is hereby incorporated by reference in its entirety. The system describes UPnP and DNS-SD as mechanisms suitable to facilitating service discovery inside and outside of a network for exemplary non-limiting purposes as other protocols and standards may be similar used without deviating from the scope and contemplation of the present invention.

The system 10 illustrates an exemplary environment where a wide area network (WAN) 12 interacts with a local area network (LAN) 14 via a gateway 16. The WAN 12 may be associated with a cable television service provider, a multiple system operator (MSO), an Internet service provider (ISP), a cellular phone service provider or other service provider having capabilities sufficient to provide or enable communications with the LAN 14. The LAN 14 may be an inside network or other private network outside or independent of the WAN 12 associated with a subscriber or customer of the service provider, such as but not necessary limited to a network small office and home office (SoHo). The gateway 16 may be a customer edge router (CER) configured to comply with RFC 6204, RFC 6204BIS, and IPv4 and IPv6 eRouter Specification (CM-SP-eRouter-I08-120329), the disclosures of which are hereby incorporated by reference in their entirety. The gateway 16, and optionally additional internal routers (IR) or other devices downstream thereof within the LAN 14, may also be configured to facilitate various operations, such as adaptive prefix delegation, role based router functionality, interface directionality assignment, overlay networking and/or multi-link service discovery, such as in the manner described in U.S. patent application Ser. Nos. 61/712,318, 61/771,807, Ser. Nos. 13/783,242, 13/792,023, 13/792,016, 13/836,948, 13/652,700 and 14/334,027, the disclosures of which are hereby incorporated by reference in their entireties.

One non-limiting aspect of the present invention contemplates facilitating service discovery when one or more of the discovered services are located/sourced outside of the LAN. FIG. 1 illustrates an exemplary scenario where cloud services sourced from devices located outside of the gateway, such as by way of the WAN or the Internet, are discoverable to a device connected to the inside of the gateway. UPnP and the Digital Living Network Alliance (DLNA), including Part 1-1: Architectures and Protocols, the disclosure of which is hereby incorporated by reference in its entirety herein, may be utilized as protocols and infrastructure sufficient to allow devices connected to the LAN to discover each other and also discover what services they provide. One non-limiting aspect of the present invention contemplates utilizing such local network discovery capabilities to facilitate exterior or non-local network discovery of services beyond the gateway.

DNS-SD and Multicast DNS (mDNS), such as the described in RFC 6762, the disclosure of which is hereby incorporated by reference in its entirety, provide mechanisms for client devices to use standard DNS programming interfaces to browse for network services. In order to browser for inside and outside network services, the client may be required to either know the location of the DNS server, which may be inside or outside of the gateway, or be restricted to the local link (LAN) as in in case of mDNS. This invention provides a mechanism for home networking devices to discover the location of a cloud service registry and from there discover the various cloud based services where UPnP provides a mechanism for devices on the LAN to discover each other and also discover what services are available on those devices. Thereafter, information collected form the local devices can then be used to facilitate non-local service discovery.

This invention proposes the creation of a service that allows devices to discover the location of the DNS-SD server without requiring the user of the device to input a uniform resource identifier (URI) or a uniform resource locator (URL) of the DNS-SD server. This invention also proposes specific namespaces to be used in the DNS-SD server that will allow a device to then query the DNS-SD server and discover UPnP/DLNA like services that are being served from the cloud.

The flow of discovery could be as follows:

1. A UPnP device will use SSDP to discover other devices on the local link.

2. The UPnP device will use the device description link in the SSDP message to query the device for available services.

3. A device can act as a "UPnP Service Registrar" and provide a specific service where it provides the location of a DNS-SD server that will provide discovery of specific UPnP services in the cloud.

4. The client device will query the DNS-SD server and find the location of cloud servers that are hosting UPnP/DLNA equivalent services.

5. The UPnP client device will continue to query the cloud servers in the same manner as it would have done it if the cloud server device would have been in the home.

With many customer equipment (CE) devices depending more and more on home networking technology for unmanaged discovery of services and with the push to the cloud for many applications and services, there is a distinct need to allow devices on the home network to discover cloud services without having to go thru proxied devices or using proprietary mechanisms. This invention would allow such devices to use existing standards for UPnP and DNS-SD to discover and consume services that are hosted in the cloud. Current mechanisms for DNS-SD and mDNS have limitations in that they either require the client to know the location of the DNS-SD server and/or discover services only on the local link as in the case of mDNS. This invention allows client devices to auto discover DNS-SD servers and also auto discover UPnP/DLNA services that are not on the local network but are in the cloud. Further the invention allows the client devices to discover and consume these cloud services in the same manner as they would have consumed these services from local home-networked devices.

A launch process 30 may begin with a user engaging a UPnP client on a device 32, such as a tablet, a set-top box (STB), a smart TV, a mobile phone, etc. The launch process may trigger the client to engage a UPnP discovery process 32 whereby the client 32 locates various services advertised by other UPnP devices, including a DNS-SD discovery service 36 advertised by another UPnP device connected to the LAN 14. The discovery process may be performed according to the noted UPnP protocol, including the use of link-local messaging, such as but not necessary limited to that associated with UDP and SSDP. A discover DNS-SD service process 38 may occur as part of the UPnP message exchange whereby the DNS-SD service 36 advertises or otherwise transmits a device description to the client 32 and/or other client/devices connected to the LAN 14. This message may include a UPnP DCP (Device Control Profile) that defines DNS-SD as a UPnP Device/Service. The device description (DCP) may be an XML schema containing vendor-specific information, definitions of embedded devices, URI/URL for presentation of the service, listings for all services, URLs for controlling eventing, etc.

The device description may be formatted and/or contain information commiserate with that shown below:

```
<?xml version="1.0"?>
<root xmlns="urn:schemas-upnp-org:device-1-0">
<specVersion>
<major>1</major>
<minor>0</minor>
</specVersion>
<URLBase>base URL for all relative iURLs</URLBase>
<device>
<deviceType>urn:schemas-upnp-org:device:cloudDiscoveryDevice:v </deviceType>
<friendlyName>short user-friendly title</friendlyName>
<manufacturer>manufacturer name</manufacturer>
<manufacturerURL>URL to manufacturer site</manufacturerURL>
<modelDescription>long user-friendly title</modelDescription>
<modelName>model name</modelName>
<modelNumber>model number</modelNumber>
<modelURL>URL to model site</modelURL>
<serialNumber>manufacturer's serial number</serialNumber>
<UDN>uuid:UUID</UDN>
<UPC>Universal Product Code</UPC>
<iconList>
<icon>
<mimetype>image/format</mimetype>
<width>horizontal pixels</width>
<height>vertical pixels</height>
<depth>color depth</depth>
<url>URL to icon</url>
```

```
</icon>
XML to declare other icons, if any, go here
</iconList>
<serviceList>
<service>
<serviceType>urn:schemas-upnp-org:service:cloudDiscoveryService:v</serviceType>
<serviceId>urn:upnp-org:serviceId:serviceID</serviceId>
<SCPDURL>URL to service description</SCPDURL>
<controlURL>URL for control</controlURL>
<eventSubURL>URL for eventing</eventSubURL>
</service>
Declarations for other services defined by a UPnP Forum working committee (if any) go here
    Declarations for other services added by UPnP vendor (if any) go here
</serviceList>
<deviceList>
Description of embedded devices defined by a UPnP Forum working committee (if any) go here
Description of embedded devices added by UPnP vendor (if any) go here
</deviceList>
<presentationURL>URL for presentation</presentationURL>
</device>
</root>
```

A find location process 40 may occur following client receipt of the device description for the DNS-SD discovery service 36. The find location process may correspond with the client 32 receiving a service description from the DNS-SD discovery service 36 having information sufficient for use in automatically identifying a DNS-SD server 42 advertising/managing one or more of the cloud services 44 available to the client 32 and/or other clients connected to the LAN 14. The service description for the DNS-SD discovery service 36 may be a new UPnP Action defined for the DNS-SD UPnP Service (e.g. GetDnsSdServers) that prompts the client 32 to launch a DNS service/capabilities. The GetDnsSdServers action may provide the client 32 with a URI/URL associated with the DNS-SD server 42 and appropriate instructions such that the client 32 becomes aware of the location at which to request further DNS services associated with the cloud services 44 without having to have prior knowledge of the location and/or without having to physically/manually input the location.

The service description may be formatted and/or contain information commiserate with that shown below:

```
<?xml version="1.0"?>
<scpd xmlns="urn:schemas-upnp-org:service-1-0">
<specVersion>
<maior>1</major>
<minor>0</minor>
</specVersion>
<actionList>
<action>
<name>GETDiscoveryServers</name>
<argumentList>
<argument>
<name>Filters</name>
<direction>in</direction>
<retval/>
<relatedStateVariable>DiscoveryServersList</relatedStateVariable>
</argument>
<!-- COMMENT Declarations for other out arguments defined by UPnP
Forum working committee (if any) go here. -->
</argumentList>
</action>
</actionList>
<serviceStateTable>
<stateVariable sendEvents="yes">
<name>DiscoveryServersList</name>
<dataType>string</dataType>
<defaultValue>Cloud DNS-SD Server 1</defaultValue>
<allowedValueList>
```

```
<allowedValue>Cloud DNS-SD Server 2</allowedValue>
<allowedValue>Cloud DNS-SD Server 3</allowedValue>
</allowedValueList>
</stateVariable>
<stateVariable sendEvents="no">
<name>StateVariableName2</name>
<dataType>ui4</dataType>
<defaultValue>default value</defaultValue>
<allowedValueRange>
<minimum>MinimumValue</minimum>
<maximum>MaximumValue</maximum>
<step>Increment</step>
</allowedValueRange>
</stateVariable>
<!-- COMMENT Declarations for other state variables defined by UPnP
Forum working committee (if any) go here. -->
<!-- COMMENT Declarations for other state variables defined by UPnP
vendor (if any)go here. -->
</serviceStateTable>
</scpd>
```

The service description and/or other information exchanged or otherwise provided to the client as part of the find location process 40 may include a URI sufficient to identify a service name and/or a domain name of the DNS-SD server 42, e.g., myservices.com. The DNS-SD server 42 may include records or other information tabulated for the cloud services 44 made available to the client 32 and/or devices connected to the LAN 14. The cloud services 44, or those having records stored at the DNS-SD server 42, maybe registered a part of a registration process 46. The registration process 46 may associate particular services with particular clients 32 and/or be a generic process where users/clients are required to authenticate access to services at a later point in time. The gateway 16, the client 32 and/or a user associated therewith may be affiliated with one or more services, particularly those suitable to facilitate the navigation of services contemplated herein. One non-limiting aspect of the present invention contemplates the DNS-SD server 42 being configured to accept and manage PTR, SRV, TXT and other records commiserate with that defined within the DNS-SD standard noted above, optionally by individually associating or otherwise managing the services determined as discoverable based on information collected during the authentication/registration of the corresponding client 32.

In this manner, the present invention contemplates providing a mechanism by which various cloud service providers 44 may register their services, applications, etc. with the DNS-SD server 42, optionally enabling the DNS-SD server 42 to individually determine whether clients 32 are entitled to access certain portion of the registered cloud services, and thereby enable those services to be discoverable to devices connected inside the gateway 16. The records or other information associated with the cloud services 44 may be kept in such a manner that the client 32, as described below in more detail, can subsequently engage the services, either from locally connected devices and/or via communications executed through the gateway 16 over the WAN/Internet 14. This capability may be particular beneficial in enabling the consumption of services that are hosted in the cloud without requiring the client 32 to know the location of the DNS-SD server 42 and/or discover services only on the local link as in the case of mDNS.

Once the client 32 knows the URI of the DNS-SD server 42, the UPnP dependent operations may cease and the client 322 may operate further by engaging a DNS application or otherwise facilitating the DNS operations contemplated herein. A DNS operation 50 may correspond with a cloud discovery process whereby the client 32 transmits a lookup message or other discovery message to the URI ascertained as part of the UPnP process. The URI may be generated by the DNS-SD discovery service 36 to be particular to the user and/or client 32 such that the appropriate records or other information/services available to the client 32 are immediately known as a function of the URI. Alternatively, the URI may be a generic URI for the DNS-SD server 42 associated with the gateway 16 or service provider associated with the subscriber/user of the client 32 such that it may not include individually self-identifying information for discoverable services and the DNS-SD server 42 other processes may be required to customize the discoverable services to those permitted for use with the client.

The lookup message may prompt the DNS-SD server 42 to generate a listing of discoverable services in the form of a PTR record. The lookup message may be formatted as follows:
nslookup-q=ptr_cloud._upnp._tcp.myservices.com.

Figure 2:
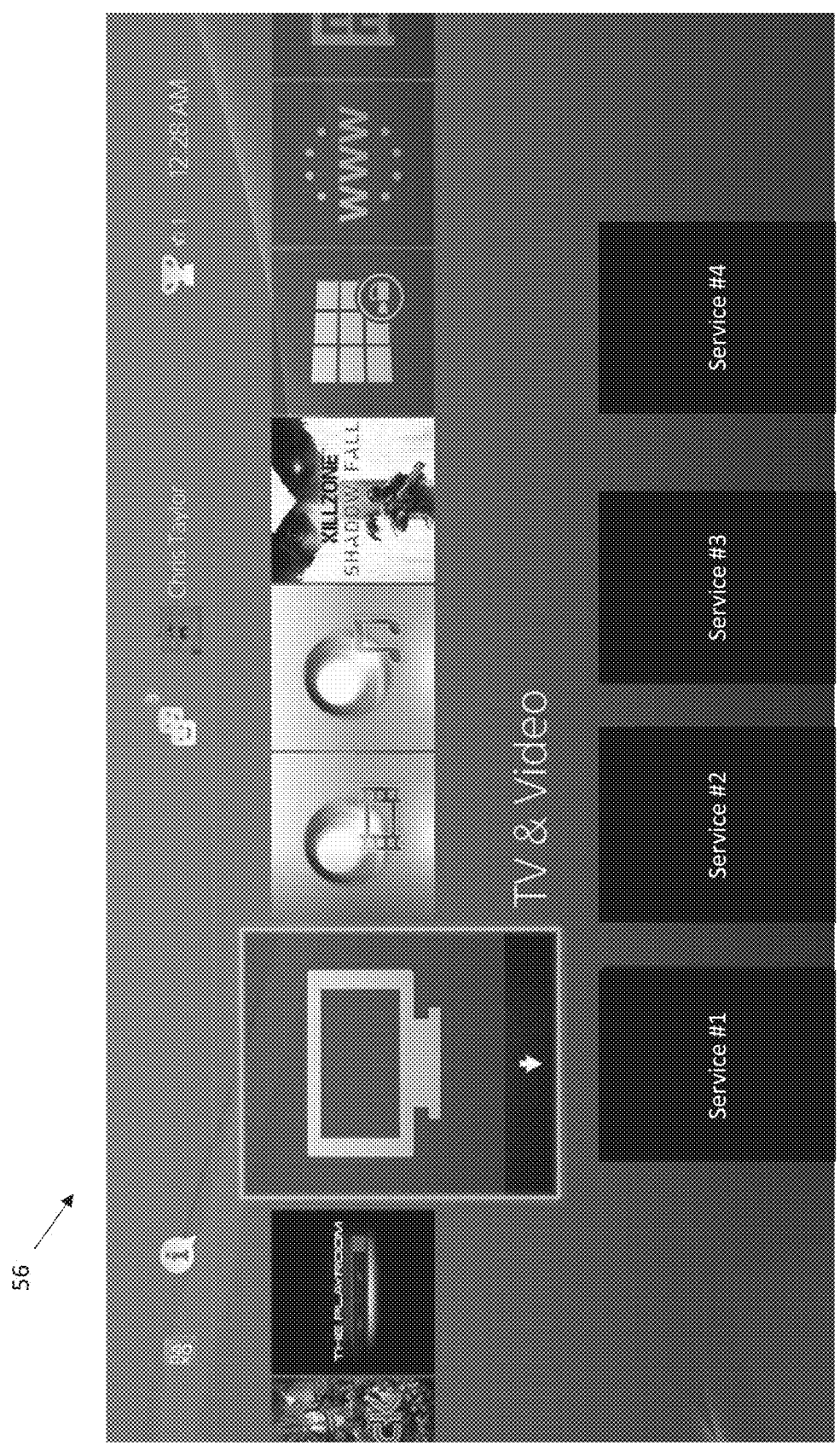
FIG. 2 illustrates a user interface in accordance with one non-limiting aspect of the present invention.

The PTR record may be generated by the DNS-SD server 42 to indicate a service instance name for each of the services included in the listing. A record delivery process 52 may correspond with the DNS-SD server 42 providing the PTR record to the client 32 via the gateway 16. The PTR record may identify the services according to an instance specified for each, such as in the manner shown below:

_cloud._upnp._tcp._msyservices.com
    Service Name 1 = Service1._http._tcp._myservices.com
    Service Name 2 =Service2._http._tcp._myservices.com
    Service Name 3 = Service3._http._tcp._myservices.com
    Service Name 4 = Service43._http._tcp._myservices.com FIG. 2 illustrates a user interface 56 in accordance with one non-limiting aspect of the present invention being configured to display the services identified in the list of services (PTR record). The services (e.g., Service1, Service2, Service3, Service4) may be displayed according to an instance or other identifying information associated therewith, which may also be communicated from the DNS-SD server 42. The user interface 56 may be a guide or other features sufficient to user engagement and may be organized in any suitable manner. One non-limiting aspect of the present invention contemplates the user interface being displayed within a Web browser or Web application operating on the client 32, such as the Web browser described in U.S. patent application Ser. No. 13/922,386, entitled Administration of Web Page, the disclosure of which is hereby Incorporated by reference in its entirety. The Web application may facilitate browsing webpages, such as but necessarily limited to those formatted according to HyperText Markup Language (HTML) and transmitted according to Hypertext Transfer Protocol (HTTP) using Transmission Control Protocol (TCP).

The user interface 56 may enable the various services and/or application associated therewith to be displayed in a common portal such that the user may navigate between them without having to close the corresponding application. As described below in more detail, the applications, services, etc. being advertised in the user interface 56 may be subsequently engaged with suitable HTTP requests and processes. The user interface 56 may be used to provide a mechanism for IP clients (TVs, tablets, phones, etc.) to auto-discover cloud-based services as a function of the UPnP and DNS-SD operations described above. Such IP client devices may not have a keyboard interface to type in the service URL (e.g. Netflix.com, Comcast.net), and even if some do, it is very cumbersome for consumers to use such keyboard interface to type in the URL for different services they want to access (e.g. Netflix.com, hulu.com, etc.).

Another mechanism for accessing services on such devices is to develop service specific application on these IP clients. Consume Electronics and MSO IP client devices (e.g. IP-STBs, TVs, Game Consoles, Blu-Ray players) include device specification applications for each service, e.g, Smart TV has multiple apps (e.g. Netflix app, Hulu app, Comcast app etc.) This leads to another issue of plethora of applications on these IP clients whereby the user interface may ameliorate the likelihood of a consumers becoming lost in the sea of these applications. Another issue with service specification applications approach is that when user wants to switch from one service to another (say from Comcast to Netflix), the user needs to undertake the following actions: stop the service being consumed; close the corresponding application; navigate through the IP client's (e.g. TV's) various menu; locate the applications menu and launch the applications menu; locate a service specific app; and launch the application. The switching enabled with the process contemplated by the present invention and the illustrated user interface enable the present invention to provide a seamless change from one service/application to another.

Using the auto-discovery mechanism proposed in this invention, a list of various cloud services (Netflix, Hulu, Pandora, Comcast, etc.) can be discovered and presented to the user using a single, unified portal/menu on IP client devices. The IP client accesses the known URL (e.g. www.myservices.com) provided in cooperation with the UPnP and DNS-SD processed described above to obtain a list of registered services. Such an aggregated portal 56 can be provided by MSOs or any other service provider or by a TV manufacturer. Instead of having to switch different applications and navigate different menus, a user will be able to access different services just like how they access different channels in a typical guide. Services can be organized based on their categories (movies, broadcast, user generated, etc.) in the portal as well. The aggregated portal can also provide a single, unified sign-on mechanism for different services avoiding users having to remember and enter different credentials for different services. Such aggregated portal of different cloud (OTT) services is especially attractive to MSOs as they try to integrate OTT services into their own video service offerings or replace their own video service offering with the OTT video aggregation service.

Following user selection of one of the listed services, a service lookup process 58 may occur where the client communicates with the DNS-SD server 42 to discover the appropriated addressing and other information necessary to access the service from the corresponding cloud 44 or local service provider. The service lookup message may be in the form of a DNS-SD SRV lookup query for an SRV record associated with the selected service (one of the instance shown in the user interface). The corresponding lookup message be as follows:
nslookup-q=SRV"Service1._http._tcp.msyservices.com The DNS-SD server 42 may transmit a service response message 60 having an SRV record or other information sufficient for the Web browser to engage the desired service. The service response message may be formatted as follows:

```
Service1._http._tcp. msyservices.com
    priority = 0, weight = 0, port = 80, host = msyservices.com
Service1._http._tcp. msyservices.com
    text = "txtvers=1" "path=/"
msyservices.com          nameserver = ns1. msyservices.com
msyservices.com          internet address = 64.142.82.154
ns1. msyservices.com     internet address = 64.142.82.152
```

The Web browser or other client 32 may process the message 60 to determine an Internet address or other addressing information necessary to access the desired service, which is shown above corresponds with instructing the client to connect to msyservices.com port 80, path "/" at the address for msyservices.com also given (64.142.82.154). The client 32 may then transmit and HTTP request 62 to the corresponding address in order to download or otherwise engage the application associated with the corresponding cloud service 44.

Figure 3:
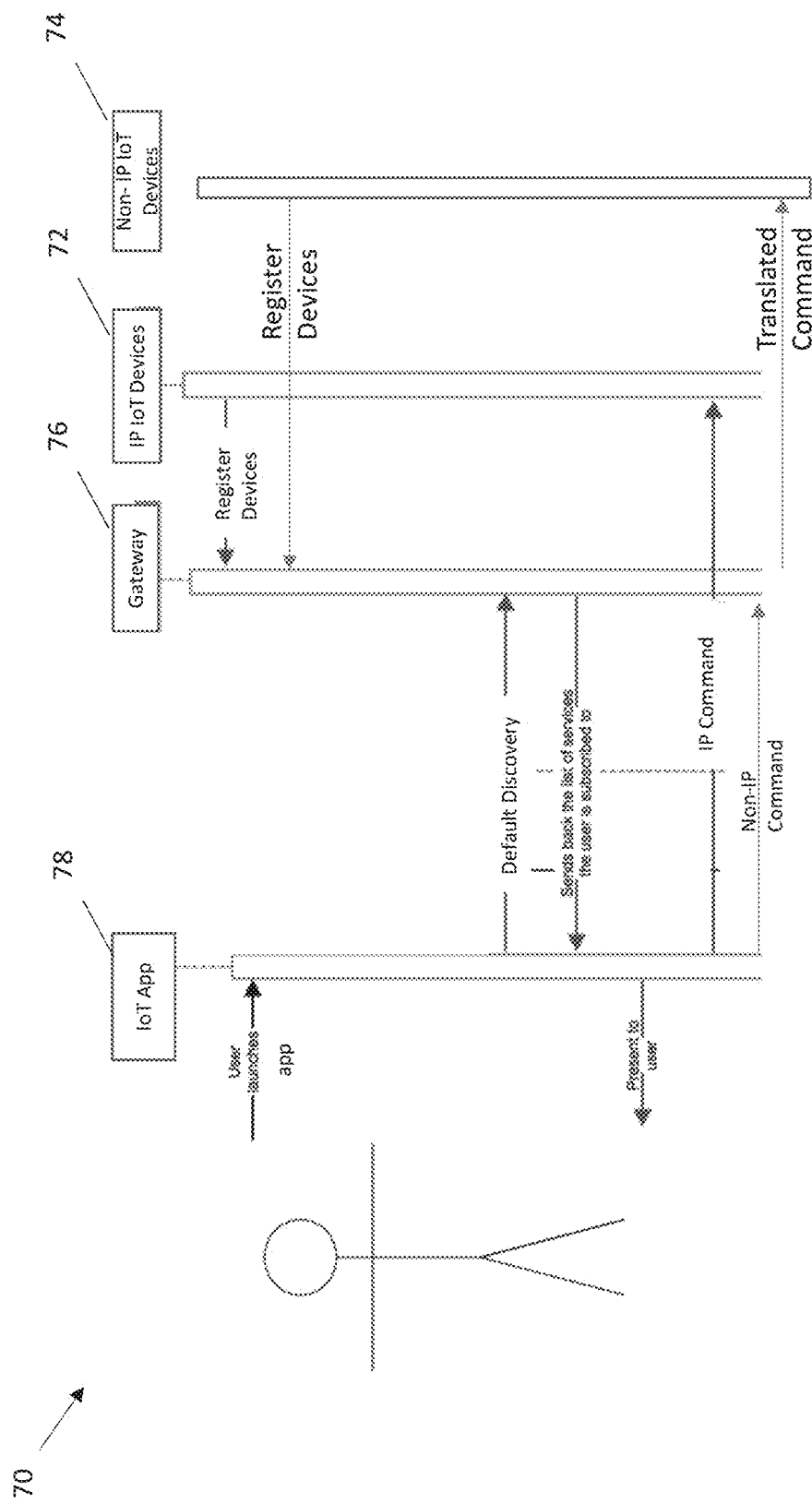
FIG. 3 illustrates a service discovery system in accordance with one non-limiting aspect of the present invention.

FIG. 3 illustrates a service discovery system 70 in accordance with one non-limiting aspect of the present invention. The system 70 is described with respect to an auto-discovery mechanism useful to provide a harmonized IP-based discovery mechanism for Internet of Things (IoT) devices 72, 74 of different types (Zigbee, ZWave, Wi-Fi, etc.) within a home network associated with a gateway or other device 76. IoT devices 72, 74 may be limited in that they only support discovery mechanism specific to the technology implemented by the device 72, 74, i.e., there is no common/harmonized mechanism for discovering and accessing various types of IoT devices 72, 74. Unless an application 78 or a device implements all the different types of technologies (e.g. ZigBee, ZWave, WiFi, Bluetooth), it is not possible to discover and access various IoT devices 72, 74. Using the mechanism proposed in this invention, an IP-based application 78 (on a mobile phone, tablet, or a PC) accompanying an IoT device registers the device at a known URL exposed by the in-home gateway 76 (e.g. 192.168.0.1/iot/iotdevices or <default gateway IP address>/iot/iotdevices).

All the information about the device 72, 74, including the control URLs for various services provided by the device 72, 74 is included in this registration process. This enables various IP based devices and control applications 78 (e.g. SmartPhone/Tablet apps) to discover various IoT devices 72, 74 over the home network irrespective of the technology implemented by the IoT device 72, 74. Using a representational state transfer (REST) based approach, these control applications 78 can also access different services provided by these IoT devices 72, 74 using the URLs registered for the IoT device 72, 74. For non-IP based devices 74, the in-home gateway 76 can act as a proxy and provide the URLs for the IoT devices 72, 74. The in-home gateway 76 may be configured to translate the IP-based REST messages received by IP-based applications 78 to the IoT device specific messages and relay them to the IoT device 72, 74 in the home.

As an example, IoT device 72, 74 has the following properties, which are encapsulated in a JSON or XML schema, as follows: Device Name: XYZSpeakerLight; Device Provider Name: ABC; Device Provider Logo: XYZ; Make: XYZ; Device Type: SpeakerLight; Brief Device Description: Speaker w/ Light; Device URI: <device IP address or default gateway>/XYZSpeakerLight; Device Ecosystem: ZigBee IP; Color: Red; Volume: 30; and Object Id: 12345. This device 72, 74 can registered at the default gateway 76 of the home network by sending the HTTP POST message to the following URL with the above IoT device information encapsulated in the JSON or XML schema as content of the message:
<default gateway IP address>/iot/iotdevices.

If the device 72 is an IP based device, then the Device URI (which is used to access/control the device) references the actual IP address of the device 72. So, the device 72 itself directly receives the control messages over the home network.
e.g. Device URI: <device IP address>/XYZSpeakerLight If the device 74 is a non-IP based device (e.g. ZigBee, Zwave), then Device URI (which is used to access/control the device) references the IP address of default gateway 76.
e.g. Device URI: <default gateway IP address>/XYZSpeakerLight Thus, the gateway 76 acts as a proxy. It hosts and exposes the REST-based interface and accepts the commands from IP based control applications 78 and translates them to the device specific protocol messages.

The information about the overall device 72, 74 (i.e. list of various properties and their values) is obtained by the application 78 issuing HTTP GET to the device's control URL, which is <device IP address>/<Device Name>
e.g. HTTP GET<device IP address>/XYZSpeakerLight The information about specific property of a device 72, 74 is obtained by the application 78 issuing HTTP GET on the following URL: <device IP address>/<Device Name>/<Device Property Name>
e.g. HTTP GET<device IP address>/XYZSpeakerLight/Volume A specific property can be set by the application 78 issuing HTTP POST message to the same URL as above for a property: <device IP address>/<Device Name>/<Device Property Name>

A list of various IoT devices 72, 74 registered in the home can be obtained by issuing HTTP GET to the following URL: <default gateway IP address>/iot/iotdevices. The result will be an array or list of JSON objects as described above, each representing individual IoT devices 72, 74. Each of the IoT objects and their associated properties can be accessed as described above. The contemplated mechanism provides a means for auto discovery by an application 78 of IoT devices (IP based or non-IP based) 72, 74 and also a standardized, REST-based mechanism sufficient for enabling the application 78 to facilitate interacting/controlling the IoT devices 72, 74.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A service discovery system for facilitating automatic discovery by a device, the device being connected to a first network associated with a gateway configured to interface communications between the first network and a second network, the system comprising:
  a server processor in operable communication with the gateway; and
  a memory having non-transitory instructions stored therein, which, when executed by the server processor, cause the server processor to:
    register services available over the first network as a function of a device profile transmitted to the gateway by a plurality of IP and non-IP devices connected to the first network; and
    provide a formatted listing of the registered services to the device connected to the first network, in response to receipt of a corresponding request for a list of registered services, the formatted listing including an identification of:
      (i) an address for each service associated with one corresponding device of the plurality of IP and non-IP devices as an address of the corresponding device; and
      (ii) an IP address for each service associated with one of the non-IP devices as the IP address of the gateway.

2. The system of claim 1, wherein the instructions further cause the server processor to enable the gateway to (i) translate a control message, used for controlling a service associated with a non-IP device of the plurality of IP and non-IP devices, prior to transmission of a corresponding control message to the non-IP device, and (ii) receive the control message for translation at the IP address of the gateway.

3. The system of claim 1, wherein the instructions further cause the server processor to register the services as a function of profiles transmitted from the plurality of IP and non-IP devices to a known universal resource locator (URL), exposed on the gateway, for the Internet of Things (IoT).

4. The system of claim 1, wherein the first network is a Local Area Network (LAN).

5. The system of claim 1, wherein the second network is a Wide Area Network (WAN).

6. The system of claim 1, wherein the plurality of IP and non-IP devices are enabled to utilize a technology of the gateway to register with the gateway.

7. The system of claim 1, wherein the plurality of IP and non-IP devices are enabled to utilize disparate technologies to register with the gateway.

8. The system of claim 1, wherein the formatted listing of the registered services is a Hypertext Transfer Protocol (HTTP) formatted listing of the registered services.

9. The system of claim 1, wherein the corresponding request for the list of registered services comprises a Hypertext Transfer Protocol (HTTP) GET.

10. The system of claim 1, wherein the instructions further cause the server processor to identify the IP address for each service associated with one of the IP devices as an IP address of the corresponding IP devices.

* * * * *